US012720638B2

(12) United States Patent
Luo et al.

(10) Patent No.: US 12,720,638 B2
(45) Date of Patent: Aug. 25, 2026

(54) METHOD AND DEVICE FOR SIDELINK COMMUNICATION

(71) Applicant: ZTE Corporation, Shenzhen (CN)

(72) Inventors: Wei Luo, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 543 days.

(21) Appl. No.: 17/864,634

(22) Filed: Jul. 14, 2022

(65) Prior Publication Data

US 2022/0353948 A1 Nov. 3, 2022

Related U.S. Application Data

(63) Continuation of application No. PCT/CN2020/075076, filed on Feb. 13, 2020.

(51) Int. Cl.

*H04W 76/28* (2018.01)
*H04W 72/1263* (2023.01)
*H04W 72/23* (2023.01)

(52) U.S. Cl.

CPC ....... *H04W 76/28* (2018.02); *H04W 72/1263* (2013.01); *H04W 72/23* (2023.01)

(58) Field of Classification Search

CPC . H04W 76/28; H04W 72/1263; H04W 72/23; H04W 76/14; H04W 28/0268; H04W 72/0446; H04W 72/25; H04W 4/06; H04W 4/40; H04W 24/08; H04W 52/0209; H04W 92/18; H04W 72/51; Y02D 30/70

See application file for complete search history.

(56) References Cited

U.S. PATENT DOCUMENTS

2018/0206252 A1 7/2018 Thangarasa et al.
2019/0053305 A1 2/2019 Saiwai et al.
2019/0090198 A1 3/2019 Zhao
2019/0174411 A1* 6/2019 Xu ........................ H04W 52/02

(Continued)

FOREIGN PATENT DOCUMENTS

CN 108307486 A 7/2018
CN 110418433 11/2019

(Continued)

OTHER PUBLICATIONS

Office action issued in Chinese application No. 202080093330.3, dated Feb. 14, 2025, 9 pages (with English translation).

(Continued)

*Primary Examiner* — Edan Orgad
*Assistant Examiner* — Malick A Sohrab
(74) *Attorney, Agent, or Firm* — Crowell & Moring LLP

(57) ABSTRACT

This disclosure relates to methods and devices for sidelink communication between communication terminals in a wireless communication network. In one implementation, the method may include receiving a discontinuous reception configuration information. The method may further include determining a discontinuous reception configuration scheme for a sidelink communication between the first user equipment and a second user equipment based on the discontinuous reception configuration information. The method may further include performing a sidelink discontinuous reception of the sidelink communication according to the discontinuous reception configuration scheme.

11 Claims, 3 Drawing Sheets

(56) References Cited

U.S. PATENT DOCUMENTS

| | | | | |
|---|---|---|---|---|
| 2021/0051588 | A1* | 2/2021 | Wu | H04W 56/001 |
| 2021/0314866 | A1* | 10/2021 | Lee | H04W 52/0229 |
| 2022/0353948 | A1 | 11/2022 | Luo et al. | |
| 2022/0361284 | A1* | 11/2022 | Liu | H04W 52/0216 |
| 2022/0369417 | A1* | 11/2022 | Park | H04W 52/0258 |
| 2023/0034294 | A1* | 2/2023 | Zhang | H04W 52/0216 |
| 2023/0064488 | A1* | 3/2023 | Han | H04W 76/28 |

FOREIGN PATENT DOCUMENTS

| | | |
|---|---|---|
| CN | 110679190 A | 1/2020 |
| EP | 3 113 548 | 1/2017 |
| EP | 3 500 028 | 6/2019 |
| WO | WO 2018/016882 | 1/2018 |
| WO | 2018/028279 | 2/2018 |
| WO | WO2018/064477 | 4/2018 |
| WO | WO 2018064477 A1 | 4/2018 |
| WO | WO 2019/030079 | 2/2019 |
| WO | WO 2021/093203 | 5/2021 |

OTHER PUBLICATIONS

Search report issued in Chinese application No. 202080093330.3, dated Feb. 14, 2025, 4 pages.

Canadian Examination Report issued Aug. 17, 2023 in corresponding Canadian Patent Application No. 3,161,691.

Office action issued in Korean application No. 10-2022-7024619, dated Jan. 15, 2025, 11 pages (with English translation).

Office action issued in Canadian application No. 3,163,546, dated Nov. 12, 2024, 3 pages.

Extended European Search Report issued Dec. 7, 2022 in corresponding European Patent Application No. 20886535.2.

Indian Office Action issued Dec. 13, 2022 in corresponding Indian Application No. 202217039084.

Anonymous: "3rd Generation Partnership Project; Technical Specification Group Radio Access Network; Evolved Universal Terrestrial Radio Access (E-UTRA); Medium Access Control (MAC) protocol specification (Release 15)", 3GPP Standard; Technical Specification; 3GPP TS 36.321, 3rd Generation Partnership Project (3GPP), Mobile Competence Centre; 650, Route Des Lucioles; F-06921 Sophia-Antipolis Cedex; France, vol. RAN WG2, No. V15.8.0 Jan. 7, 2020 (Jan. 7, 2020), pp. 1-134, XP051860509, ftp://ftp.3gpp.org/Specs/archive/36_series/36.321/36321-f80zip 36321-f80.docx [retrieved on Jan. 7, 2020] * Section 5.7; p. 54-p. 57.

Anonymous: "3rd Generation Partnership Project; Technical Specification Group Radio Access Network; Evolved Universal Terrestrial Radio Access (E-UTRA); Medium Access Control (MAC) protocol specification (Release 15)", 3GPP Standard; Technical Specification; 3GPP TS 36.321, 3rd Generation Partner, Jan. 7, 2020, the whole document, 1-22.

Japanese Notice of Reasons for Rejection issued May 26, 2023 in corresponding Japanese Patent Application No. 2022-544088 with translation.

Intel Corporation, ITL, Discontinuous reception over SL, 3GPP TSG RAN WG2#97bis R2-1703502, 3GPP, Mar. 25, 2017.

Intel Corporation, ITL, DRX in sidelink, 3GPP TSG RAN WG#97 R2-1701309, 3GPP, Feb. 4, 2017.

Intel Corporation, ITL, DRX in sidelink, 3GPP TSG RAN WG2#96 R2-167764, 3GPP, Nov. 5, 2016.

Intel Corporation, Introduction of DRX over PC5, 3GPP TSG-RAN WG2#95bis R2-166255, 3GPP, Oct. 1, 2016.

ZTE, Consideration of SA2 assumption about feD2D, 3GPP TSG RAN WG2#99bis R2-1711017, 3GPP, Sep. 29, 2017.

Office Action issued in corresponding Chinese Patent Application No. 202080093330.3 dated Aug. 19, 2024 with English translation, 27 pages.

Japanese Notice of Reasons for Rejection issued Sep. 5, 2023 in corresponding Japanese Patent Application No. 2022-544088 with English translation.

LG Electronics, Summary of Email Discussion on Rel-17 Sidelink Enhancement, 3GPP TSG RAN#86 RP-192745, 3GPP, Dec. 2, 2019.

International Search Report issued Jul. 20, 2020 in International (PCT) Application No. PCT/CN2020/075076.

Written Opinion of the International Searching Authority issued Jul. 20, 2020 in International (PCT) Application No. PCT/CN2020/075076.

ZTE, "3GPP TSG-RAN WG2 #95bis, R2-166798" *Some considerations on the power of efficiency of R14 feD2D*, Sep. 30, 2016.

Intel Corporation etc. "3GPP TSG RAN WG2#97, R2-1701309" *DRX in sidelink*, Feb. 4, 2017.

* cited by examiner

FIG. 2

METHOD AND DEVICE FOR SIDELINK COMMUNICATION

This application is a continuation application of PCT International Application No. PCT/CN2020/075076, filed with the China National Intellectual Property Administration, PRC on Feb. 13, 2020, which is herein incorporated by reference in its entirety.

TECHNICAL FIELD

This disclosure is directed generally to wireless communications and particularly to sidelink communication between communication terminals including vehicles.

BACKGROUND

Sidelink is a unilateral wireless communication service, i.e., the communication between the communication terminals. Vehicle networking refers to a large scale system for wireless communication and information exchange among vehicles, pedestrians, roadside equipments, and internet in accordance with agreed communication protocols and data exchange standards. The vehicle networking communications enable the vehicles to gain driving safety, improve traffic efficiency, and acquire convenience or entertainment information. The vehicle networking communication may be categorized into three types as per the objects of wireless communication: the communication between vehicles, i.e., vehicle-to-vehicle (V2V); the communication between vehicles and roadside equipments/network infrastructures, i.e., vehicle-to-infrastructure/vehicle-to-network (V2I/V2N); and the communication between vehicles and pedestrians, i.e., vehicle-to-pedestrian (V2P). These types of communications collectively are referred to as vehicle-to-everything (V2X) communication.

In the V2X communication research of 3rd Generation Partnership Project (3GPP), the sidelink based V2X communication method between user equipments is one of the manners to implement the V2X standard, in which traffic data is directly transmitted from a source user equipment to a destination user equipment via an air interface without forwarding by the base station and the core network, as shown in FIG. 1. This V2X communication is referred to as PC5-based V2X communication or V2X sidelink communication.

With the technology advancement and development of the automation industry, the scenarios for V2X communications are further diversified and require higher performance. The advanced V2X services include vehicle platooning, extended sensors, advanced driving (semi-automated driving and full-automated driving), and remote driving. The desired performance requirements may include: supporting data packet with the size of 50 to 12000 bytes, transmission rate with 2 to 50 messages per second, the maximum end-to-end delay of 3 to 500 milliseconds, reliability of 90% to 99.999%, data rate of 0.5 to 1000 Mbps, as well as transmission range of 50 to 1000 meters.

SUMMARY

This disclosure is directed to methods, systems, and devices related to wireless communication, and more specifically, for sidelink communication between communication terminals to save the power of the communication terminals.

In one embodiment, a method performed by a first user equipment in a wireless communication network is disclosed. The method may include receiving a discontinuous reception configuration information. The method may further include determining a discontinuous reception configuration scheme for a sidelink communication between the first user equipment and a second user equipment based on the discontinuous reception configuration information. The method may further include performing a sidelink discontinuous reception of the sidelink communication according to the discontinuous reception configuration scheme.

In one embodiment, a method performed by a first user equipment in a wireless communication network is disclosed. The method may include receiving a sidelink discontinuous reception configuration scheme of a second user equipment. The method may further include reselecting of a transmission resource for sidelink communication with the second user equipment based on the sidelink discontinuous reception configuration scheme.

In one embodiment, a method performed by a first user equipment in a wireless communication network is disclosed. The method may include receiving a sidelink discontinuous reception configuration scheme of a second user equipment. The method may further include determining a sidelink discontinuous reception configuration adjustment information based on the sidelink discontinuous reception configuration scheme. The method may further include transmitting to the second user equipment the sidelink discontinuous reception configuration adjustment information.

In another embodiment, a device for wireless communication may include a memory storing instructions and a processing circuitry in communication with the memory. When the processing circuitry executes the instructions, the processing circuitry is configured to carry out the above methods.

In another embodiment, a computer-readable medium comprising instructions which, when executed by a computer, cause the computer to carry out the above methods.

The above and other aspects and their implementations are described in greater detail in the drawings, the descriptions, and the claims below.

BRIEF DESCRIPTION OF THE DRAWINGS

FIG. 2 illustrates a flow diagram of a method for sidelink communication in accordance with an embodiment.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
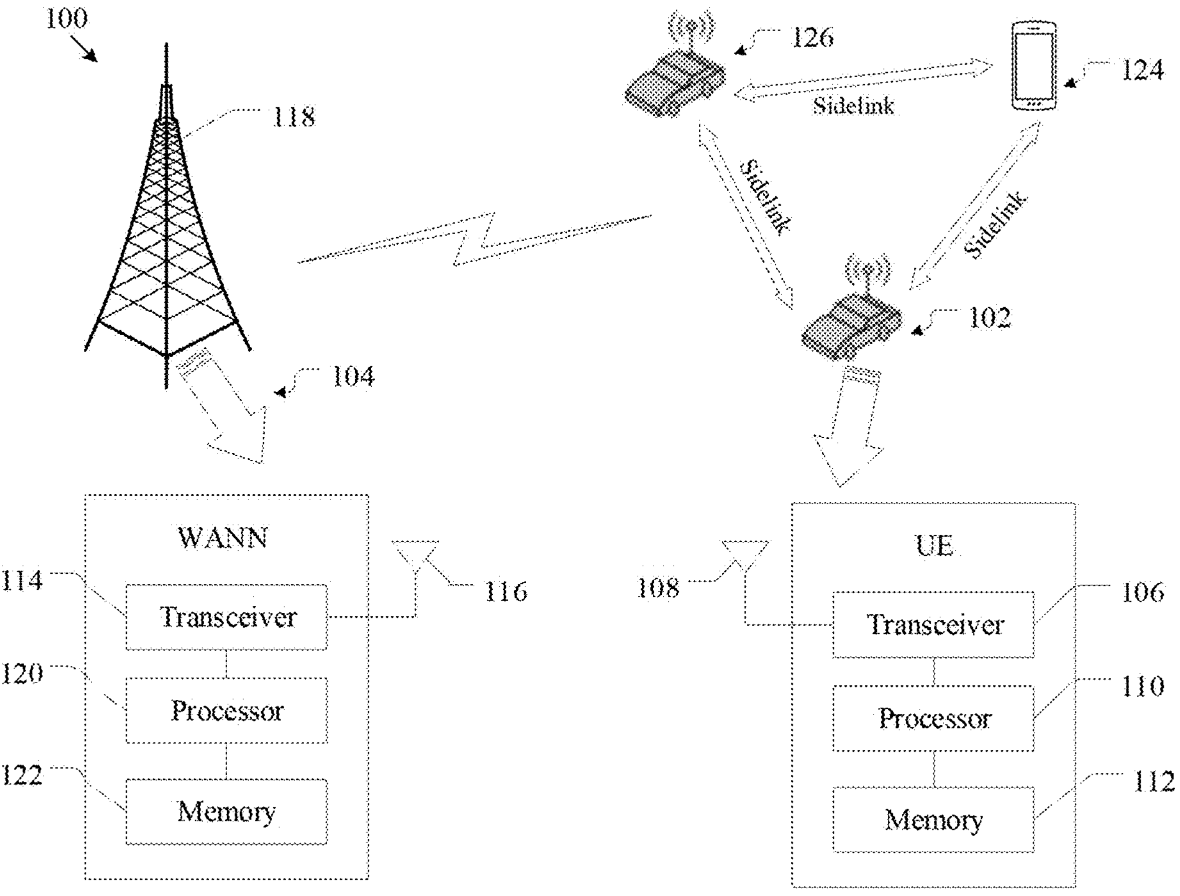
FIG. 1 illustrates an example diagram of a wireless communication network in accordance with various embodiments.

A wireless access network provides network connectivity between a user equipment (UE) and an information or data network such as a text, voice or video communication network, the Internet, and the like. An example wireless access network may be based on cellular technologies, which may further be based on, for example, 4G LTE or 5G NR technologies and/or formats. FIG. 1 shows an example system diagram of wireless communication network 100 including UEs 102, 124, and 126 as well as a wireless access network node (WANN) 104 according to various embodiments. The UEs 102, 124, and 126 may include but is not limited to a mobile phone, smartphone, tablet, laptop computer, a vehicle on-board communication equipment, roadside communication equipment, a smart electronics or appliance including an air conditioner, a television, a refrigerator, an oven, or other devices that are capable of communicating wirelessly over a network. The UEs may directly communicate with each other via the sidelinks. Take the UE 102 as example, it may include transceiver circuitry 106 coupled to an antenna 108 to effect wireless communication with the wireless access network node 104. The transceiver circuitry 106 may also be coupled to a processor 110, which may also be coupled to a memory 112 or other storage devices. The memory 112 may store therein instructions or code that, when read and executed by the processor 110, cause the processor 110 to implement various ones of the methods described herein.

Similarly, the wireless access network node 104 may comprise a base station or other wireless network access points capable of communicating wirelessly over a network with one or more UEs. For example, the wireless access network node 104 may comprise a 4G LTE base station, a 5G NR base station, a 5G central-unit base station, or a 5G distributed-unit base station. Each type of these wireless access network nodes may be configured to perform a corresponding set of wireless network functions. The set of wireless network functions between different types of wireless access network nodes may not be identical. The set of wireless network functions between different types of wireless access network nodes, however, may functionally overlap. The wireless access network node 104 may include transceiver circuitry 114 coupled to an antenna 116, which may include an antenna tower 118 in various approaches, to effect wireless communication with the UEs 102, 124, and 126. The transceiver circuitry 114 may also be coupled to one or more processors 120, which may also be coupled to a memory 122 or other storage devices. The memory 122 may store therein instructions or code that, when read and executed by the processor 120, cause the processor 120 to implement various ones of the methods described herein.

For simplicity and clarity, only one WANN and three UEs are shown in the wireless communication network 100. It will be appreciated that one or more WANNs may exist in the wireless communication network, and each WANN may serve one or more UEs in the meantime. Besides UEs and WANNs, the network 100 may further comprise any other network nodes with different functions such as the network nodes in core network of the wireless communication network 100. In addition, while various embodiments will be discussed in the context of the particular example wireless communication network 100, the underlying principle applies to other applicable wireless communication networks.

In the sidelink communication such as V2X communication between UEs, the UEs need to monitor the sidelink signals within the entire range of sidelink receive resource pool, which incurs huge power consumption and low efficiency. One of the objectives of the present disclosure is to reduce the power consumption of the sidelink communication while meeting the time delay requirements.

Figure 2:
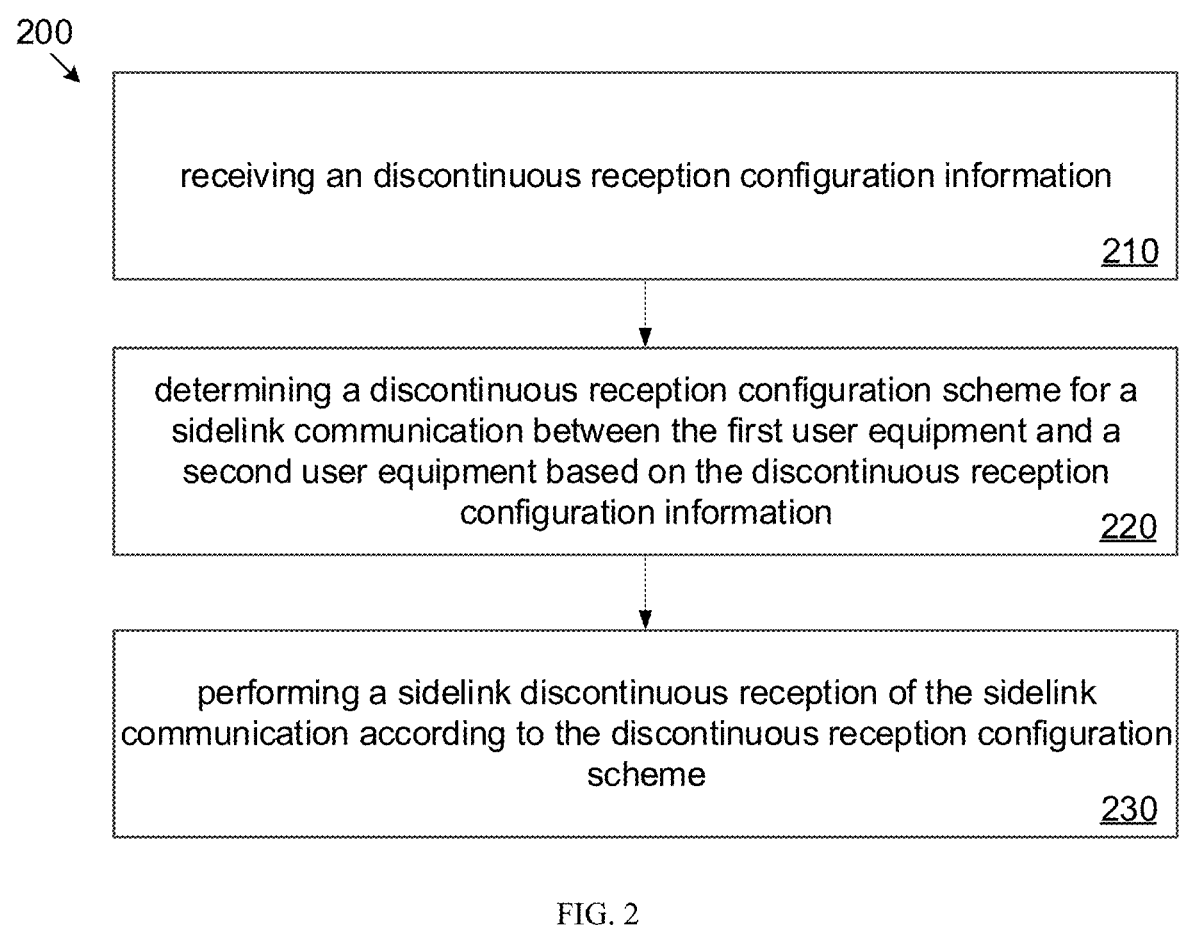

FIG. 2 illustrates an exemplary implementation 200 for sidelink communication of the user equipments. The UE 102 may receive a discontinuous reception (DRX) configuration information (210), determine a DRX configuration scheme for a sidelink communication between the UE 102 and the UE 124 based on the DRX configuration information (220), and perform a sidelink discontinuous reception of the sidelink communication according to the DRX configuration scheme (230). The DRX configuration scheme may indicate a reception on duration and/or a reception off duration. As such, the UE 102 may monitor physical sidelink control channel (PSCCH) to receive the sidelink communication only at time domain intersection between the reception on duration and a sidelink reception resource pool for the sidelink communication.

Next, various detailed embodiments will be discussed with reference to FIGS. 1 and 2 to set forth the technical solutions in the present disclosure.

First Embodiment

The UE 102 may receive the DRX configuration information from a wireless access network node such as the WANN 104 (210). The DRX configuration information may include at least one set of DRX configuration parameters. A set of DRX configuration parameters may include, for example, a sidelink DRX cycle, a time duration, an on duration time pattern, a first non-active timer, and a second non-active timer. The on duration time pattern may include a slot bitmap indicating the sidelink DRX on duration, which will be discussed in detail later.

In some implementation, the DRX configuration information may further include association information between the set of DRX configuration parameters and the corresponding sidelink resource pool. Specifically, the set of DRX configuration parameters may be used to configure the DRX configuration scheme for receiving sidelink communication within the range of the corresponding resource pool.

Alternatively or additionally, the DRX configuration information may further include association information between the set of DRX configuration parameters and a traffic type in the sidelink communication. The traffic type may be represented by a destination identifier, a destination identifier index, a destination UE identifier, or a destination UE identifier index. The destination identifier and destination identifier index may refer to a type of sidelink traffic without differentiating the transmit UEs. The destination UE identifier and the destination UE identifier index may refer to a type of sidelink traffic transmitted from a specific UE. Examples of various types of traffic may include safe driving information, road traffic information, entertaining information, and the like.

In some implementation, the sidelink DRX configuration information may include a mapping between a quality of service requirement and a set of DRX configuration parameters or an index of the set of DRX configuration parameters.

The quality of service requirement may include, for example, time delay, reliability, traffic priority, error rate, quality of service identifier, and quality of service flow identifier.

Alternatively or additionally, the sidelink DRX configuration information may include a mapping between a user equipment state information and the set of discontinuous reception configuration parameters or an index of the set of discontinuous reception configuration parameters. The user equipment state information may indicate, for example, a pedestrian user equipment, a non-pedestrian user equipment, a user equipment with power saving requirement, a user equipment without power saving requirement, and a level of power saving.

Alternatively, the quality of service requirement and the user equipment state information may pair into an item. The sidelink DRX configuration information may include a mapping between the paired item and the set of discontinuous reception configuration parameters or an index of the set of discontinuous reception configuration parameters.

Alternatively or additionally, the sidelink DRX configuration information may include a mapping between a transmission manner and a set of discontinuous reception configuration parameters or an index of the set of discontinuous reception configuration parameters. The transmission manner may include, for example, unicast, multicast, and broadcast.

In some implementation, the UE 102 may receive the DRX configuration information by receiving sidelink resource pool information from the WANN 104. The sidelink resource pool information may include a set of discontinuous reception configuration parameters associated with a sidelink resource pool indicated by the sidelink resource pool information. In the DRX configuration information, the DRX configuration parameters may include on duration time pattern. The on duration time pattern may include a slot bitmap indicating a sidelink DRX on duration corresponding to an entry in the associated sidelink resource pool. The DRX configuration parameters may further include a sidelink DRX cycle with a value of M. The value M may indicate that the length of the sidelink DRX cycle is M multiple of a cycle length of the associated sidelink resource pool. Alternatively, the value M may indicate that the length of the sidelink DRX cycle is M multiple of a length of a slot bitmap of the associated sidelink resource pool.

The UE 102 may receive the sidelink DRX configuration information from the WANN 104 via a radio resource control (RRC) dedicated message. Alternatively, the UE 102 may receive the sidelink DRX configuration information from the WANN 104 via a broadcast message.

Returning to FIG. 2, after receiving the DRX configuration information from the WANN 104 (210), the UE 102 may determine the DRX configuration scheme for the sidelink communication between the UE 102 and the UE 124 based on the discontinuous reception configuration information (220). For example, the UE 102 may simply read the DRX configuration parameters from the DRX configuration information and apply the DRX configuration parameters to the DRX configuration scheme. For another example, the UE 102 may select DRX configuration parameters from the DRX configuration information based on a current state of the UE 102 and/or a quality of service for a traffic that the UE 102 is monitoring.

Once the sidelink DRX configuration scheme is set, the UE 102 does not have to continuously monitor the PSCCH. Instead, the UE 102 may only monitor the PSCCH during the reception on duration. But it may still monitor other physical layer channels anytime.

Optionally, before receiving the DRX configuration information from the WANN 104, the UE 102 may transmit to the WANN 104 a capability information indicating whether the UE 102 supports sidelink discontinuous reception, a user equipment state information, and/or a quality of service requirement. The WANN 104 may determine whether configure or activate the sidelink DRX for the UE 102 based on the capability information indicating whether the UE 102 supports sidelink discontinuous reception, a user equipment state information, and/or a quality of service requirement.

Alternatively or additionally, the UE 102 may transmit to the WANN 104 a semi-persistent schedule (SPS) assistant information. The SPS assistant information may include, for example, traffic characteristics of the sidelink logical channel(s) setup for the sidelink communication and the estimated data arrival periodicity in the sidelink logical channel(s). The WANN 104 may determine whether configure or activate the sidelink DRX for the UE 102 based on the SPS assistant information.

Optionally, after receiving the DRX configuration information from the WANN 104, the UE 102 may transmit a DRX configuration adjustment information to the WANN 104. For example, the DRX configuration adjustment information may include an adjustment request. The WANN 104 may generate a new DRX configuration information for the UE 102 based on the adjustment request and transmit the new DRX configuration information to the UE 104. For another example, the DRX configuration adjustment information may include the DRX configuration information that has been adjusted by the UE 102. As such, the WANN 104 may use the adjusted DRX configuration information to update the DRX configuration information for the UE 102 on the WANN 104 end.

Optionally, before transmitting the DRX configuration adjustment information to the WANN 104, the UE 102 may need to receive an adjustment information configuration message from the WANN 104. The adjustment information configuration message may indicate whether a DRX configuration adjustment is allowed or whether a DRX configuration adjustment report is allowed. As such, the UE 102 may transmitting the DRX configuration adjustment information to the WANN 104 only if the WANN 104 allows the DRX configuration adjustment or the DRX configuration adjustment report.

Optionally, the UE 102 may first transmit a DRX configuration request for the sidelink DRX configuration information to the WANN 104. The WANN 104 may transmit the DRX configuration information to the UE 102 only when receiving the DRX configuration request. Optionally, the UE 102 may transmit the DRX configuration request to the WANN 104 only after receiving a DRX configuration request message indicating whether the DRX configuration request is allowed or whether a DRX configuration request report is allowed. For example, if the WANN 104 allows the DRX configuration request or the DRX configuration request report, the UE 102 may transmit the DRX configuration request. Otherwise, the UE 102 may not transmit the DRX configuration request to the WANN 104.

Second Embodiment

The UE 102 may receive the DRX configuration information from another UE such as the UE 124 (210). The DRX configuration information may include at least one set of DRX configuration parameters. A set of DRX configuration parameters may include, for example, a sidelink DRX cycle, a time duration, an on duration time pattern, a first non-active timer, and a second non-active timer.

The UE 102 may receive the DRX configuration information from the UE 124 via a unicast sidelink RRC message, a multicast sidelink RRC message, or a broadcast sidelink RRC message.

In some implementation, the DRX configuration information may further include association information between the set of DRX configuration parameters and the corresponding sidelink resource pool. Specifically, the set of DRX configuration parameters may be used to configure the DRX configuration scheme for receiving sidelink communication within the range of the corresponding resource pool.

In some implementation, the UE 102 may receive the DRX configuration information by receiving sidelink resource pool information from the UE 124. The sidelink resource pool information may include a set of discontinuous reception configuration parameters associated with a sidelink resource pool indicated by the sidelink resource pool information. In the DRX configuration information, the DRX configuration parameters may include on duration time pattern. The on duration time pattern may include a slot bitmap indicating a sidelink DRX on duration corresponding to an entry in the associated sidelink resource pool. The DRX configuration parameters may further include a sidelink DRX cycle with a value of M. The value M may indicate that the length of the sidelink DRX cycle is M multiple of a cycle length of the associated sidelink resource pool. Alternatively, the value M may indicate that the length of the sidelink DRX cycle is M multiple of a length of a slot bitmap of the associated sidelink resource pool.

Optionally, after receiving the sidelink DRX configuration information transmitted from the UE 124, the UE 102 may transmit the sidelink DRX configuration information to the WANN 104. Alternatively or additionally, the UE 102 may transmit both the sidelink DRX configuration information and an identification of the UE 124 to the WANN 104. The identification of the UE 124 may be represented by a destination UE identifier, a destination UE identifier index, a destination identifier, or a destination identifier index.

The WANN 104 may adjust the sidelink DRX configuration information and then transmit the adjusted sidelink DRX configuration information to the UE 102. Upon receiving the adjusted DRX configuration information from the WANN 104, the UE 102 may determine the DRX configuration scheme based on the adjusted discontinuous reception configuration information.

Returning to FIG. 2, after receiving the DRX configuration information from the UE 124 (210), the UE 102 may determine the DRX configuration scheme for the sidelink communication between the UE 102 and the UE 124 based on the discontinuous reception configuration information (220). For example, the UE 102 may simply read the DRX configuration parameters from the DRX configuration information and apply the DRX configuration parameters to the DRX configuration scheme. For another example, the UE 102 may select DRX configuration parameters from the DRX configuration information based on a current state of the UE 102 and/or a quality of service requirement for a traffic that the UE 102 is monitoring.

Once the sidelink DRX configuration scheme is set, the UE 102 does not have to continuously monitor the PSCCH. Instead, the UE 102 may only monitor the PSCCH during the reception on duration.

Third Embodiment

The UE 102 may receive a first DRX configuration information from the UE 124 and a second DRX configuration information from the UE 126 (210). Either the first or the second DRX configuration information may include at least one set of DRX configuration parameters. A set of DRX configuration parameters may include, for example, a sidelink DRX cycle, a time duration, an on duration time pattern, a first non-active timer, and a second non-active timer.

After receiving a first DRX configuration information from the UE 124 and a second DRX configuration information from the UE 126, the UE 102 may determine the DRX configuration scheme for the sidelink communication between the UE 102 and the UE 124 based on the first DRX configuration information and the second DRX configuration information. For example, the UE 102 may determine DRX configuration parameters by taking into account the sets of DRX configuration parameters in both the first and second DRX configuration information and apply the determined DRX configuration parameters to the DRX configuration scheme.

Once the sidelink DRX configuration scheme is set, the UE 102 does not have to continuously monitor the PSCCH. Instead, the UE 102 may only monitor the PSCCH during the reception on duration.

Fourth Embodiment

By way of examples, this embodiment will discuss the manners that a UE may receive the DRX configuration information of another UE in different scenarios.

Scenario 1: The UEs are in Unicast Sidelink Communication

In this scenario, the UEs in communication, such as the UE 102 and the UE 124, may establish a sidelink RRC connection. The UEs may exchange their own current DRX configuration scheme via the PC5 RRC connection. As such, the transmit UE may take into account the sidelink DRX configuration scheme of the receiver UE when selecting the transmission resources. Additionally, the subframes between the UEs should be aligned after exchanging the DRX configuration schemes.

Scenario 2: The UEs are in Multicast Communication

In this scenario, a transmit UE may need to take into account the DRX configuration schemes of all the receiver UEs when selecting the transmission resources. Thus, all the UEs in the multicast communication may be required to exchange their own current DRX configuration scheme with each other.

To the end, multicast sidelink RRC connections may be established for the exchanging. Alternatively, the sidelink DRX configuration schemes may be transmitted as multicast messages. Alternatively, the UEs may separately establish unicast connections with each other for the transmission of the sidelink DRX related configuration. Alternatively, the UEs may exchange their own sidelink DRX configuration schemes with each other via a sidelink signaling such as network protocol messages (NAS messages).

Fifth Embodiment

By way of examples, this embodiment will discuss which device is proper to configure the sidelink DRX configuration parameters for a UE in different scenarios, the wireless access node serving the UE or other UEs in sidelink communication with the UE.

Scenario 1: The UE is in RRC Connection with the Wireless Access Node

With respect to the UE such as the UE 102 with RRC connection, it may be proper for the WANN 104 to configure the sidelink DRX configuration parameters. As such, the UE 102 may report to the WANN 104 some assistant information regarding the UE 102 such as the capability information indicating whether the UE 102 supports sidelink discontinuous reception, a UE state information, a quality of service requirement, and a semi-persistent schedule assistant information.

Aside from the capability information and the UE state information, the WANN 104 may refer to the service features of data packet that the UE 102 has interest in receiving from transmit UEs such as the UE 124 and the UE 126 via sidelink. The UE 102 may obtain information related to such service features from the transmit UEs. For example, where the UE 102 establishes a unicast connection, the transmit UE may transmit its own SPS assistant information to the receive UE 102, which may derive the arrival timing of the data packet from the SPS assistant information. For another example, the transmit UEs may transmit its quality of service information including the time delay requirement to the UE 102. For a further example, the transmit UEs may transmit recommended DRX configuration information to the UE 102 based on the service features of the message to be transmitted. After receiving the aforementioned information related to the service features from the transmit UEs, the UE 102 may transmit them to the WANN 104, which then configure the DRX configuration parameters for the UE 102 with reference to the information related to the service features.

Optionally, after the UE 102 determines or updates its own DRX configuration scheme, it may transmit the updated DRX configuration scheme to the transmit UEs.

Alternatively or additionally, when the UE 102 has multiple independent sidelink DRX configuration schemes and is in unicast connection communication, the transmit UE such as the UE 124 or the UE 126 may configure the sidelink DRX configuration parameters for the UE 102 bases on the service features and time delay requirements of the transmit UE. Upon receiving the sidelink DRX configuration parameters, the UE 102 may directly apply them to its sidelink DRX configuration scheme.

Alternatively, the UE 102 may transmit the received sidelink DRX configuration parameters to the WANN 104, and then the WANN 104 may make determination whether to amend the sidelink DRX configuration scheme of the UE 102.

Scenario 2: The UE is in Idle State

In this situation, the wireless access node such as the WANN 104 can only configure cell-specific DRX configuration parameters via system message. Because some information specific to the UE 102 such as the state of the UE and data packet features may impact the configuration of the DRX configuration parameters for the UE, the WANN 104 may broadcast the mappings between the UE specific information and the DRX configuration parameters. Then, the UE 102 may select the corresponding DRX configuration parameters according to its own current state and the traffic that the UE 102 has interest in monitoring.

Alternatively or additionally, if the UE 102 has multiple independent sidelink DRX configuration schemes and is in unicast connection communication, the transmit UE such as the UE 124 or the UE 126 may configure the sidelink DRX configuration parameters for the UE 102 bases on the service features and time delay requirements of the transmit UE. Upon receiving the sidelink DRX configuration parameters, the UE 102 may directly apply them to its sidelink DRX configuration scheme. Alternatively, the UE 102 may determine whether to amend the received sidelink DRX configuration parameters based on its own power saving option, and transmit the amended sidelink DRX configuration parameters to the transmit UE.

Scenario 3: The UE is not Covered by the Wireless Access Node

In this situation, the wireless access node may not be able to configure the DRX configuration parameters. As such, the UE may have to make use of the predefined mappings between the UE specific information, such as the state of the UE and features of data packets to be received by the UE, and the DRX configuration parameters to determine its DRX configuration scheme.

Sixth Embodiment

By way of examples, this embodiment will discuss using slot bitmap to indicate on duration time pattern in the DRX configuration parameters.

A slot bitmap may indicate which slots or symbols are sidelink reception resources. In some implementation, the sidelink DRX cycle is configured, which may be an integral multiple of the cycle of the sidelink reception resource pool, i.e. the length of the slot bitmap. Alternatively, the cycle of the sidelink reception resource pool may be an integral multiple of the sidelink DRX cycle. Accordingly, the reception on duration may be configured as the number of slots within the sidelink resource pool after the beginning of a DRX cycle.

Similarly, a slot bitmap may indicate which slots are configured to be reception on or reception off within the range of the indicated transmission resources. In some implementation, the sidelink DRX bitmap is configured. For example, there are ten slots within a cycle of the sidelink resource pool, and the slots 1, 2, 6, 7, 9 serve as the sidelink reception resource pool. On the basis of the five slots, a sidelink DRX bitmap may be used to indicate which of them are reception on duration slots. In particular, because the number of slots for sidelink reception is five within a cycle of sidelink resource pool, the cycle of the side DRX bitmap can be configured to be five. The sidelink DRX bitmap may, for example, be [1, 0, 1, 0, 1], which means that the DRX is on in the slots 1, 6, and 9 and the DRX is off in the slots 2 and 7. In the similar fashion, the DRX is on in the slots of 11, 16, 19, 21, 26, 29 . . . and the DRX is off in the slots of 12, 17, 22, 27, . . . .

Optionally, the cycle of the sidelink DRX bitmap may be longer than the cycle of the sidelink resource pool. As such, the parameter sidelink DRX cycle can be configured to be integral N multiple of the cycle of the sidelink reception resource pool. If N is 2, then the cycle of the side DRX bitmap equals ten (2*5). As an example, the side DRX bitmap may be [1, 0, 1, 0, 1, 1, 0, 0, 0, 1], which means that the DRX is on in the slots 1, 6, 9, 11, 19 and the DRX is off in the slots 2, 7, 12, 16, 17.

In the case that the wireless access node such as the WANN 104 configures the DRX configuration parameters for the UE 102, because the WANN 104 also configure the sidelink reception resource pool for the UE 102, it may configure either the sidelink DRX cycle or the sidelink DRX bitmap as the DRX configuration parameter for the UE 102.

In the case that the transmit UE such as the UE 124 or the UE 126 configures the DRX configuration parameters for the UE 102, the connection type between the UE 102 and the transmit UE may be considered as a factor to determine which DRX configuration parameter may be configured, the sidelink DRX cycle or the sidelink DRX bitmap.

In particular, if the UE 102 and the transmit UE have established a unicast connection, the transmit UE may receive assistant information from the UE 102 such that the transmit UE may configure either the sidelink DRX cycle or the sidelink DRX bitmap as the DRX configuration parameter for the UE 102. The assistant information may include, for example, reception resource pool information, power saving requirement, the sidelink DRX configuration information that configured for the UE 102 by the WANN 104 or other transmit UEs.

If the UE 102 and the transmit UE are in multicast communication or broadcast communication and sidelink RRC connections are not established, the transmit UE may only be able to transmit the sidelink configuration information in the manner of broadcasting. In this case, the transmit UE cannot get the reception resource pool information of the receive UE 102. Thus, the transmit UE can only configure the sidelink DRX cycle as the DRX configuration parameter for the UE 102.

In the case that the UE is out of the coverage by the wireless access node, because both the sidelink reception resource pool and the sidelink DRX configuration information are preconfigured, either the sidelink DRX cycle or the sidelink DRX bitmap can be configured.

Seventh Embodiment

By way of examples, this embodiment will discuss that the UE 102 may be configured with multiple DRX configuration schemes, each of which may have a set of sidelink DRX configuration parameters.

In some implementation, the multiple DRX configuration schemes may be configured as per different destination UEs. In particular, the DRX on duration pattern may be customized for different destination UEs. For example, the UE 102 establishes sidelink connections with both the UE 124 and the UE 126. The UE 124 and the UE 126 have completely different transmission resource pool configuration, and thus the resource positions to be monitored may be different. In this case, two DRX configuration schemes may be configured for the UE 102 to respectively adapt to the different resource positions to be monitored.

In another implementation, the multiple DRX configuration schemes may be configured as per different sidelink reception resource pool configuration. For example, if the UE 102 are configured with multiple reception resource pools, the multiple DRX configuration schemes may correspond to these reception resource pools respectively.

Eighth Embodiment

By way of examples, this embodiment will discuss the UE 102 reporting the measured sidelink channel state information (CSI) when the UE 102 is configured with the DRX configuration scheme.

Specifically, the UE 102 may receive a sidelink CSI report configuration information comprising a CSI report masking from, for example, the UE 124. The CSI report masking may indicate whether to delay reporting a sidelink channel state indication until a sidelink active time. The reception on/off duration set in the DRX configuration scheme may define sidelink active/inactive time for the UE 102. Where the CSI report masking indicates that the delay is required, the UE 102 may delay reporting the sidelink CSI until the sidelink active time defined by the DRX configuration scheme. Thus, if the UE is configured with a sidelink DRX, the most recent CSI measurement timing may occur in the sidelink DRX active time for CSI to be reported.

Figure 3:
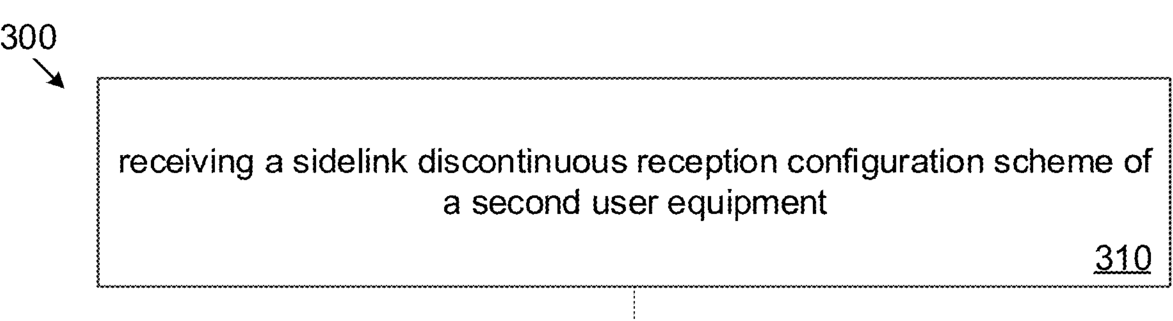
FIG. 3 illustrates a flow diagram of a method for sidelink communication in accordance with another embodiment.

FIG. 3 illustrates an exemplary implementation 300 for sidelink communication of the user equipments. In this implementation, the UE 102 may receive a sidelink discontinuous reception configuration scheme of another user equipment such as the UE 124 (310). The sidelink discontinuous reception configuration scheme may, for example, include a reception off duration for the UE 124. If a time domain of transmission resource of the UE 102 falls within the reception off duration, the UE 102 may trigger a reselection of the transmission resources to accommodate to the sidelink discontinuous reception configuration scheme of the UE 124 (320).

Figure 4:
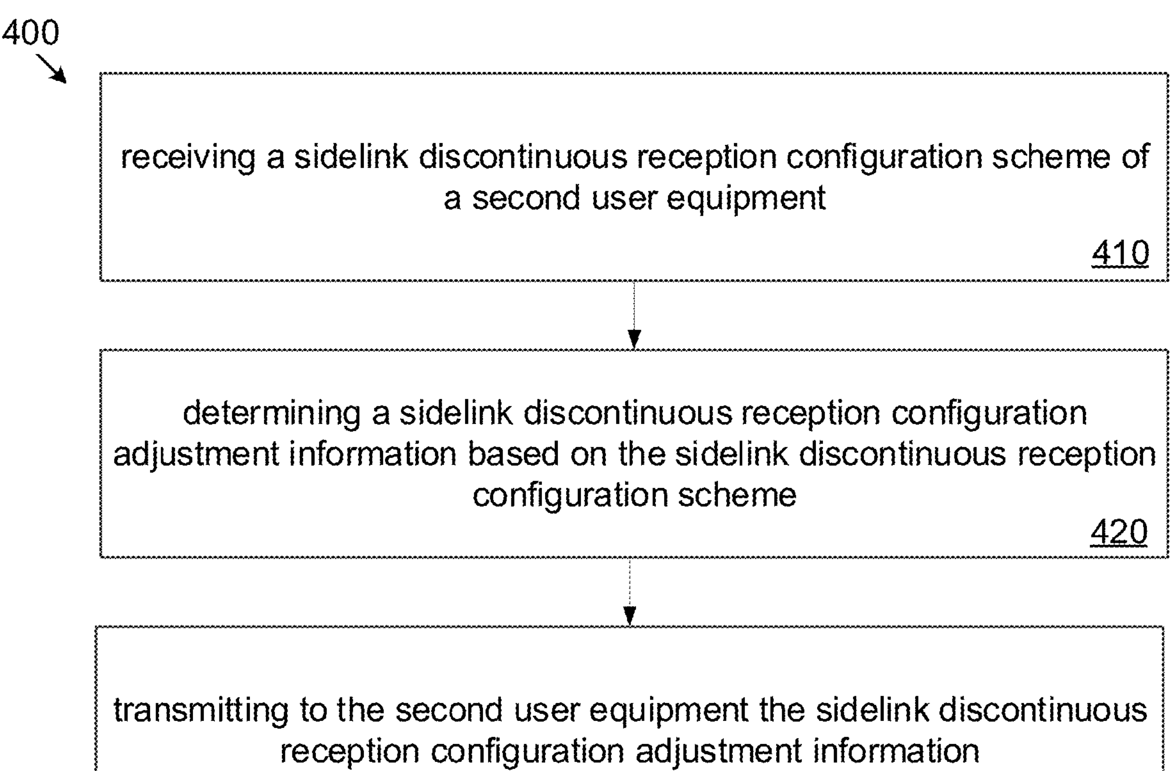
FIG. 4 illustrates a flow diagram of a method for sidelink communication in accordance with another embodiment.

By contrast, FIG. 4 illustrates an exemplary implementation 400 in which the UE 102 may not accommodate to the sidelink discontinuous reception configuration scheme of the UE 124.

Specifically, upon receiving a sidelink DRX configuration scheme of another user equipment such as the UE 124 (410), the UE 102 may determine a sidelink DRX configuration adjustment information based on the sidelink DRX configuration scheme (420) and then transmit to the UE 124 the sidelink DRX configuration adjustment information (430).

The sidelink DRX configuration adjustment information may include an adjustment value for a sidelink DRX cycle defined in the sidelink DRX configuration scheme. The adjustment value may be either an incremental/decremental value relative to the value of the sidelink DRX cycle or an updated value of the sidelink DRX cycle.

Alternatively, the sidelink DRX configuration adjustment information may include an adjustment value for a DRX slot offset defined in the sidelink DRX configuration scheme. The adjustment value may be either an incremental/decremental value relative to the value of the DRX slot offset or an updated value of the DRX slot offset.

Upon receiving the sidelink DRX configuration adjustment information, the UE 124 may update the reception off duration/reception on duration in its DRX configuration scheme base on the adjustment information such that the time domain of transmission resource of the UE 102 falls within the updated reception on duration for the UE 124.

Optionally, before transmitting the discontinuous reception configuration adjustment information to the UE 124, the UE 102 may need to receive, for the UE 124, an adjustment information configuration message indicating whether a discontinuous reception configuration adjustment is allowed or whether a discontinuous reception configuration adjustment report is allowed. The UE 102 may transmit the discontinuous reception configuration adjustment information to the UE 124 only when the UE 124 allows the discontinuous reception configuration adjustment or the discontinuous reception configuration adjustment report.

In another implementation, upon receiving a sidelink discontinuous reception configuration scheme of another user equipment such as the UE 124, the UE 102 may transmit to the UE 124 a sidelink DRX configuration assistant information, which may, for example, include the transmit resource pool information of the UE 102. With the sidelink DRX configuration assistant information, the UE 124 may, for example, adjust the reception off duration/reception on duration in its DRX configuration scheme to such that the time domain of transmission resource of the UE 102 falls into the reception on duration, instead of the reception off duration.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a first user equipment in a wireless communication network, comprising:

receiving an discontinuous reception configuration information from a wireless access node serving the first user equipment, wherein the discontinuous reception configuration information comprises one or more sets of discontinuous reception configuration parameters, each of the one or more sets of discontinuous reception configuration parameters comprises at least one of a sidelink discontinuous reception cycle, a time duration, an on duration time pattern, a first non-active timer, or a second non-active timer, the discontinuous reception configuration information received from the wireless access node further comprises a mapping between a quality of service requirement and a set of discontinuous reception configuration parameters or an index of a set of discontinuous reception configuration parameters;

determining a discontinuous reception configuration scheme for a sidelink communication between the first user equipment and a second user equipment based on the discontinuous reception configuration information received from the wireless access node, wherein the determining the discontinuous reception configuration scheme comprises selecting discontinuous reception configuration parameters from the discontinuous reception configuration information received from the wireless access node based on the quality of service requirement for a traffic that the first user equipment is monitoring;

performing a sidelink discontinuous reception of the sidelink communication according to the discontinuous reception configuration scheme;

before receiving the discontinuous reception configuration information, transmitting a discontinuous reception configuration request for the discontinuous reception configuration information; and before transmitting the discontinuous reception configuration request, receiving a discontinuous reception configuration request message indicating whether the discontinuous reception configuration request is allowed or whether a discontinuous reception configuration request report is allowed.

2. The method of claim 1, wherein the discontinuous reception configuration scheme indicates a reception on duration, the performing the sidelink discontinuous reception comprises:

monitoring physical sidelink control channel to receive the sidelink communication only at a time domain intersection between the reception on duration and a sidelink reception resource pool for the sidelink communication.

3. The method of claim 1, wherein the on duration time pattern comprises a slot bitmap indicating a sidelink discontinuous reception on duration.

4. The method of claim 1, wherein the determining the discontinuous reception configuration scheme comprises:

determining one or more discontinuous reception configuration schemes respectively based on each of the one or more sets of discontinuous reception configuration parameters.

5. The method of claim 1, wherein the discontinuous reception configuration information further comprises at least one of:

a mapping between a user equipment state information and the set of discontinuous reception configuration parameters or the index of the set of discontinuous reception configuration parameters;

a mapping between a pair of a quality of service requirement and a user equipment state information and the set of discontinuous reception configuration parameters or the index of the set of discontinuous reception configuration parameters; or a mapping between a transmission manner and the set of discontinuous reception configuration parameters or the index of the set of discontinuous reception configuration parameters.

6. The method of claim 1, wherein the quality of service requirement comprises at least one of time delay, reliability, traffic priority, and error rate, quality of service identifier, and quality of service flow identifier.

7. The method of claim 5, wherein the determining the discontinuous reception configuration scheme comprises:

select the discontinuous reception configuration parameters from the discontinuous reception configuration information based on a current state of the first user equipment and the quality of service requirement for a traffic that the first user equipment is monitoring.

8. The method of claim 1, further comprising:

before receiving the discontinuous reception configuration information from the wireless access node, transmitting to the wireless access node at least one of a capability information indicating whether the first user equipment supports sidelink discontinuous reception, a user equipment state information, a quality of service requirement, and a semi-persistent schedule assistant information.

9. The method of claim 1, further comprising:

after receiving the discontinuous reception configuration information from the wireless access node, transmitting a discontinuous reception configuration adjustment information to the wireless access node.

10. The method of claim 9, further comprising:

before transmitting the discontinuous reception configuration adjustment information to the wireless access node, receiving an adjustment information configuration message indicating whether discontinuous reception configuration adjustment is allowed or whether discontinuous reception configuration adjustment report is allowed.

11. The method of claim 1, wherein the receiving the discontinuous reception configuration information comprises:

receiving a first discontinuous reception configuration information from the second user equipment and a second discontinuous reception configuration information from a third user equipment; and the determining the discontinuous reception configuration scheme comprises:

determining the discontinuous reception configuration scheme based on the first discontinuous reception configuration information and the second discontinuous reception configuration information.

* * * * *